United States Patent [19]
Broadhurst et al.

[11] Patent Number: 6,047,038
[45] Date of Patent: Apr. 4, 2000

[54] SYSTEM FOR, AND METHOD OF, REGULATING THE AMOUNT OF POWER PROVIDED BY BATTERY IN A PROCESSING APPARATUS

[75] Inventors: William A. Broadhurst, San Diego; Gregory A. Stoike, Poway, both of Calif.

[73] Assignee: Integrated Systems Design Center, San Diego, Calif.

[21] Appl. No.: 09/036,965

[22] Filed: Mar. 9, 1998

[51] Int. Cl.[7] .................................................. G07C 3/00
[52] U.S. Cl. ................................ 377/16; 377/1; 377/39; 320/114; 320/136
[58] Field of Search ........................... 320/112–115, 106, 320/107, 127, 135, 136, 155; 377/1, 16, 39

[56] References Cited

U.S. PATENT DOCUMENTS

| | | | |
|---|---|---|---|
| 5,317,601 | 5/1994 | Riordan et al. | 375/107 |
| 5,469,116 | 11/1995 | Slemmer | 331/74 |
| 5,638,028 | 6/1997 | Voth | 331/25 |
| 5,887,178 | 3/1999 | Tsujimoto et al. | 395/750.05 |

*Primary Examiner*—Margaret R. Wambach
*Attorney, Agent, or Firm*—Fulwider Patton; Ellsworth R. Roston

[57] ABSTRACT

A first device provides a repetitive count of time. A second device indicates in each successive count of time by the first device during the processing apparatus operation whether the processing apparatus has processed data for at least a first particular percentage of time in each such successive time count. A third device indicates in each successive count of time by the first device during the processing apparatus operation whether the processing apparatus has processed data for at least a second particular percentage of time in each such successive time count where the second particular time percentage is less than the first particular time percentage. A power supply provides power to the processing apparatus during the time that the apparatus is processing data. A control device adjusts the amount of power supplied to the processing apparatus, during the time that the apparatus is processing data, in accordance with the indications provided by the second and third devices in the successive counts of time by the first device. Specifically, the control device increases the power level supplied to the processing apparatus when the time percentage is greater than the first particular value. The control device decreases the power level supplied to the processing apparatus when the time percentage is less than the second particular value. The increases and decreases in the power level may be respectively provided by increases and decreases in the frequency of a clock signal in the processing apparatus.

34 Claims, 1 Drawing Sheet

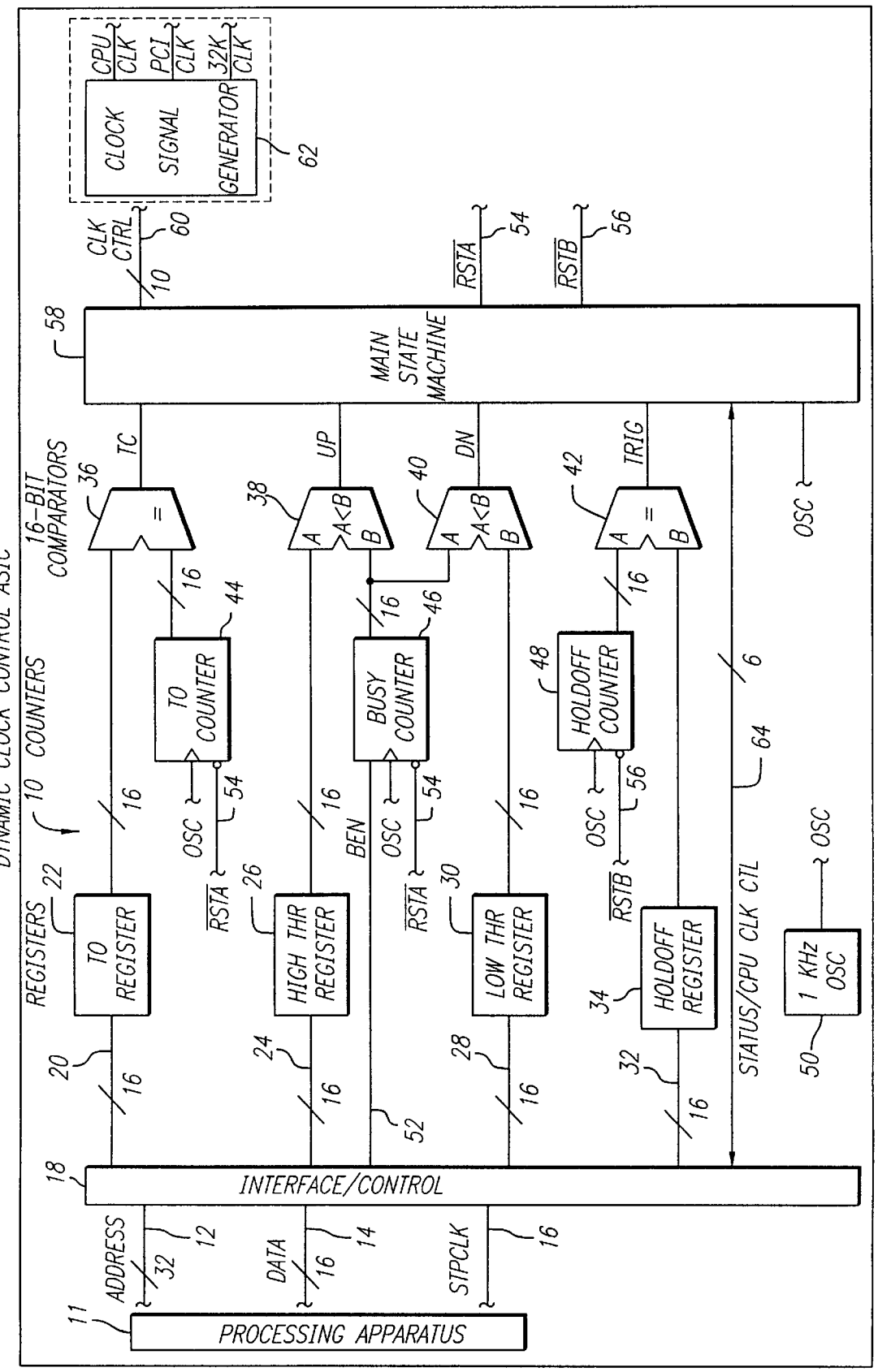

SYSTEM FOR, AND METHOD OF, REGULATING THE AMOUNT OF POWER PROVIDED BY BATTERY IN A PROCESSING APPARATUS

This invention relates to systems for, and methods of, controlling the amount of power introduced to apparatus such as a laptop computer or a notebook computer at each instant. More particularly, this invention relates to systems for, and methods of, regulating the amount of power introduced to apparatus such as a laptop computer or a notebook computer so that such apparatus receives at each instant only the amount of power required to operate such apparatus, thereby prolonging the life of the battery in such apparatus.

BACKGROUND OF THE INVENTION

Many different types of apparatus receive power from batteries in such apparatus to operate such apparatus. Such batteries can supply only a limited amount of power to such apparatus before the energy level in such batteries becomes so low that the apparatus is no longer operative. Good examples of such apparatus are laptop computers and notebook types of personal computers.

It has been recognized for some time that it would be desirable to conserve the energy provided by the batteries in apparatus such as laptop computers or notebook computers so that such batteries provide at each instant only the power level required to operate such apparatus. It has also been recognized for some time that it would be desirable to provide systems in a simple and straightforward manner for conserving such energy. In spite of such recognition, no one has provided such a system until now.

BRIEF DESCRIPTION OF THE INVENTION

A first device provides a repetitive count of time. A second device indicates in each successive count of time by the first device during the processing apparatus operation whether the processing apparatus such as the laptop computer or the notebook computer has processed data for at least a first particular percentage of time in each such successive time count. A third device indicates in each successive count of time by the first device during the processing apparatus operation whether the processing apparatus has processed data for at least a second particular percentage of time in each such successive time count where the second particular time percentage is less than the first particular time percentage.

A power supply provides power to the processing apparatus during the time that the apparatus is processing data. A control device adjusts the amount of power supplied to the processing apparatus, during the time that the apparatus is processing data, in accordance with the indications provided by the second and third devices in the successive counts of time by the first device.

Specifically, the control device increases the power level supplied to the processing apparatus when the time percentage is greater than the first particular value. The control device decreases the power level supplied to the processing apparatus when the time percentage is less than the second particular value. The increases and decreases in the power level may be respectively determined from increases and decreases in the frequency of a clock signal in the processing apparatus.

In this way, any change to be made in the frequency of the signals to be introduced to the processing apparatus is determined in first alternate periods of time that the processing apparatus is operating. Any change in the frequency of the signals introduced to the processing apparatus is made in accordance with this determination during second alternate periods of time that the processing apparatus is operating.

BRIEF DESCRIPTION OF THE SINGLE FIGURE

The single figure is a circuit diagram, primarily in block form, of one embodiment of the invention for regulating the amount of power applied at each instant to apparatus such as a laptop computer or a notebook computer.

DETAILED DESCRIPTION OF THE INVENTION

In one embodiment of the invention, a system generally indicated at 10 is provided for regulating the amount of power applied at each instant to processing apparatus 11 such as a laptop computer or a notebook computer. A plurality of lines or buses may be provided from the apparatus 11 such as the laptop computer. These include a bus 12 for providing addresses from the processing apparatus 11, a bus 14 for providing data from the processing apparatus and a line 16 (designated as STPCLK) for indicating when the processing apparatus has not been activated. When the processing apparatus 11 has not been activated, the voltage on the line 16 is low. An indication of "/32" is provided in the bus 12 to indicate that the signals in the bus may have 32 binary bits and an indication of "/16" is provided in the bus 14 to indicate that the signals in the bus may have 16 binary bits.

The signals from the buses 12 and 14 and from the line 16 are introduced to an interface/control 18. Signals are introduced on a bus 20 from the interface/control 18 to a register 22. These signals provide a pre-set count to any predetermined value in the register 22. Signals are also introduced on a bus 24 from the interface/control 18 to a register 26. These signals provide a pre-set count to any predetermined value in the register 26. Signals also pass on a bus 28 from the interface/control 18 to a register 30. These signals provide a pre-set count to any predetermined value in the register 30. Signals also pass on a bus 32 to a register 34. These signals provide a pre-set count to any predetermined value in the register 34. The pre-set counts in the registers 22, 26, 30 and 34 are independent of one another. However, the pre-set count in the register 26 is greater than the pre-set count in the register 30. Furthermore, the pre-set count in the register 22 is greater than the pre-set count in the register 26. An indication of "/16" is provided on each of the buses 20, 24 and 28 and on other buses in FIG. 1 to indicate that the signals in these buses may have 16 binary bits.

The outputs from the registers 22, 26, 30 and 34 are respectively introduced to input terminals of comparators 36, 38, 40 and 42. The output from a counter 44 is introduced to an input terminal of the comparator 36; the output from a counter 46 is introduced to input terminals of the comparators 38 and 40; and the output of a counter 48 is introduced to an input terminal of the comparator 42.

An oscillator 50 having a suitable frequency such as approximately one kilohertz (1 KHz) provides input signals to the counters 44, 46 and 48. The output of the oscillator 50 is indicated as "OSC" in the single Figure. A line 52 from the interface/control 18 also provides inputs to the counter 46. The counters 44 and 46 receive signals on a line 54 (designated as RSTA) and the counter 48 receives signals on a line 56 (designated as RSTB).

The outputs of the comparators 36, 38, 40 and 42 are introduced to a main state machine 58. The main state machine 58 provides the signals (RSTA) on the line 54 and the signals (RSTB) on the line 56. The main state machine 58 also provides signals on a line 60 for introduction to a clock signal generator 62.

Status/CPU clock control lines 64 are disposed between the interface/control 18 and the main state machine 58. As will be seen by arrows at the ends of the lines 64, the lines extend from the interface/control 18 to the main state machine 58 and from the main state machine to the interface/control. The lines 64 extending from the interface/control 18 to the main state machine 58 instruct the main state machine to become activated. This occurs when the processing apparatus such as the laptop computer or the notebook computer becomes activated to initiate the processing of data. The lines 64 extending from the interface/control 18 to the main state machine 58 additionally instruct the main state machine 58 to set the frequency of the clock signal generator 62 to a maximum value or a minimum value. The lines 64 extending from the main state machine 58 to the interface/control 18 indicate the particular state in which the system 10 is operating at each instant. The lines 64 between the main state machine 58 and the interface/control are indicated in the single FIGURE as "status/CPU clk ctl."

A number of the stages shown in the single Figure and described above may be disposed on an integrated circuit chip. These include the interface/control 18, the registers 22, 26, 30 and 34, the comparators 36, 38, 40 and 42, the counters 44, 46 and 43, the oscillator 50 and the main state machine 58. The clock signal generator 62 may be disposed in the processing apparatus such as the personal computer or laptop computer.

The counter 44 operates on a continuous basis, independently of whether or not the processing apparatus 11 is operating to count the clock signals from the oscillator 50. As will be seen from the subsequent discussion, the counter 44 operates only during the time that the signal RSTA from the main state machine 58 is high. When the count of the clock signals in the counter 44 reaches a particular value pre-set in the register 22, the comparator 36 provides a signal to the main state machine 58 which initiates a new count in the counter 44 when the RSTA signal from the main state machine 58 again become high. The counter 46 becomes reset at the same time as the counter 44 because of the introduction of the RSTA signal to the counter 46. The output of the comparator 36 is indicated as "Tc" in the single Figure.

During the time that the processing apparatus 11 is not operating, the processing apparatus provides a low signal (STPCLK) to the interface/control 18. This causes the interface/control 18 to introduce a low signal to the counter 46 to prevent the counter from operating. When an address or data passes from the processing apparatus 11 to the interface/control 18, the signal (STPCLK) on the line 16 becomes high and a signal of high amplitude passes on the line 52 to the counter 46. This activates the counter 46 to provide a count in the counter of the signals from the oscillator 50 during the time that the signal on the line 52 is high. This count continues during the time that the counter 44 is counting on the repetitive basis to the pre-set value in the register 42. Since the counter 46 is counting the signals from the oscillator 50 only during the time that an address or data is passing from the processing apparatus 11 to the interface/control 18, the count in the counter 46 indicates the amount of power that is being consumed in the processing apparatus. In effect, then, the counter 46 is counting the percentage of time, in each repetitive time period provided by the register 22, the comparator 36 and the counter 44, that the processing apparatus 11 is providing addresses or data to the interface/control 18. Another way of considering the operation of the registers 26 and 30, the counter 46 and the comparators 38 and 46 is that they determine the duty cycle of the power needed by the processing apparatus 11 in each repetitive time period. The counter 46 then becomes reset at the same time as the counter 44 to provide a new count in the counter when the count in the counter 44 has reached the pre-set value.

The count in the counter 46 at the time of each resetting of the counter is compared in the comparator 38 with the pre-set count in the register 26. (The output of the comparator 38 is indicated as "Up" in the single Figure.) If the count in the counter 46 at such time is greater than the pre-set count in the register 26, this indicates that the power level in the processing apparatus 11 should be increased to match the needs of the processing apparatus. However, if the count in the counter 46 at such time is less than the pre-set count in the register 26, this indicates that the power level in the processing apparatus does not have to be increased.

The count in the counter 46 at the time of each resetting of the counter is also compared in the comparator 40 with the pre-set count in the register 30 when the counter 44 is reset. (The output from the comparator 40 is indicated as "On" in the single Figure.) If the count in the counter 46 at such time is greater than the pre-set count in the register 30, this indicates that the power level in the processing apparatus does not have to be decreased. However, if the count in the counter 46 at such time is less than the pre-set count in the register 30, this indicates that the power level in the processing apparatus 11 is greater than is needed at that instant and that the power level in the processing apparatus should be decreased. ¶As previously indicated, the count in the register 26 is greater than that in the register 30. Furthermore, as previously indicated, no change is made in the power level in the processing apparatus 11 when the count in the counter 46 is less that the count in the register 26 and is greater than that in the register 30. The difference between the counts in the registers 26 and 30 represents an equilibrium region where no change has to be made in the power in the processing apparatus 11. It will accordingly be seen that this range of equilibrium between the settings in the registers 26 and 30 can be somewhat arbitrary. For example, the registers 26 and 30 can be set to the same value to provide a sensitive response to changes in the amount of power needed at each instant in the processing apparatus 11. Alternatively, the registers 26 and 30 can be set to different values to decrease the sensitivity to changes in the amount of power needed at each instant in the processing apparatus 11.

The power level needed in the processing apparatus at each instant is determined at such instant from changes in the frequency of the clock signals in the clock signal generator 62. When the power level in the processing apparatus 11 is to be increased, the main state machine 50 produces an increase in the frequency of the clock signals in the generator 62 in accordance with the signals from the comparator 38 and introduces these clock signals to the processing apparatus 11. When the power level in the processing apparatus 11 is to be decreased, the main state machine 50 produces a decrease in the frequency of the clock signals in the generator 62 in accordance with the signals from the comparator 40 and introduces these signals to the processing apparatus.

In this way, the main state machine 58 regulates the amount of power provided in the processing apparatus such as the laptop computer at each instant in accordance with the changes in the frequency of the clock signals from the generator 62 so that only the amount of power required to operate the processing apparatus satisfactorily at that instant is introduced to the processing apparatus at that instant. This prolongs the life of the battery in the processing apparatus 11 such as the laptop computer or the notebook computer. The life of the battery in the processing apparatus 11 such as the laptop computer or the notebook computer may illustratively be increased by as much as twenty-five percent (25%) by the system of this invention.

The counters 44 and 46 provide a count during the time that the signal (RSTA) on the line 54 from the main state machine 58 is high. During this time, the signal $\overline{RSTB}$ on the line 56 is low so that no count can be provided in the counter 48. Upon the occurrence of each pre-set count in the counter 44, the main state machine 58 provides a low signal $\overline{RSTB}$ on the line 54 to prevent the counters 44 and 46 from counting. The main state machine 58 provides a high signal (RSTB) on the line 56 at the same time that it provides a low signal $\overline{RSTA}$ on the line 54. The high signal (RSTB) on the line 56 causes the counter 48 to count to a value pre-set into the register 34. During this time, the main state machine 58 provides a signal on the line 60 to the clock signal generator 62 to change the frequency of the clock signals if a signal indicating such a change has been generated in one of the comparators 38 and 40. This allows any change in the frequency of the clock signals in the generator 62 to become settled during the time that the counter 48 is counting to the value preset into the register 34 and before a new count is initiated in the counter 44 and 46 to obtain a determination as to whether the power needed to operate the processing apparatus 11 has to be changed.

Upon the occurrence of the count in the counter 48 to the value pre-set in the register 34, the main state machine 58 produces a high signal (RSTA) on the line 54. This causes a new count to be initiated in the counters 44 and 46. At the same time, the main state machine 58 introduces a low signal (RSTB) to the counter 48 to prevent the counter from counting. In this way, the counters 44, 46 and 48 are sequenced so that the counters 44 and 46 are counting while the counter 48 is idle and so that the counter 48 is thereafter counting while the counters 44 and 46 are idle.

In this way, any change to be made in the frequency of the signals from the clock signal generator 62 is determined during the time that the signal $\overline{RSTA}$ on the line 54 is high and the signal $\overline{RSTB}$ on the line 56 is low. Any change in the frequency of the clock signals from the clock signal generator 62 is made in accordance with this determination during the time that the signal $\overline{RSTA}$ on the line 54 is low and the signal $\overline{RSTB}$ on the line 56 is high.

Although this invention has been disclosed and illustrated with reference to particular embodiments, the principles involved are susceptible for use in numerous other embodiments which will be apparent to persons of ordinary skill in the art. The invention is, therefore, to be limited only as indicated by she scope of the appended claims.

We claim:

1. In combination for providing a controlled amount of power to an apparatus for processing addresses and data intermittently, a first device for providing repetitive time periods, a second device for indicating in each repetitive time period whether the processing apparatus has processed the addresses and data for at least a first particular percentage of time in the repetitive time period, a third device for indicating in each repetitive time period whether the processing apparatus has processed addresses and data for a time period no greater than a second particular percentage of time in the repetitive time period, the second particular percentage of time being less than the first particular percentage of time, and a control device for providing for an adjustment in the amount of power to be provided by the processing apparatus, when the processing apparatus has been activated to process addresses and data, in accordance with the indications provided by the second and third devices in the repetitive time periods.

2. In a combination as set forth in claim 1 wherein a generator provides a clock signal at a variable frequency and wherein the control device varies the frequency of the clock signal from the generator in accordance with the indications provided by the second and third devices in the repetitive time periods.

3. In a combination as set forth in claim 1 wherein a circuit is included to delay the beginning of each repetitive time period by the first device after the end of the previous repetitive time period to provide for an adjustment, in accordance with the operation of the control device, in the amount of power to be provided by the processing apparatus.

4. In a combination as set forth in claim 2 wherein a circuit is included to delay the beginning of each repetitive time period by the first device, after the end of the previous repetitive time period to provide for an adjustment, in accordance with the operation of the control device, in the amount of power to be provided by the processing apparatus.

5. In a combination as set forth in claim 2 wherein the control device does not provide for any adjustment in the amount of power to be provided by the processing apparatus when the processing apparatus has processed addresses and data for a percentage of time between the first and second particular percentages of time in each repetitive time period and wherein the control device provides for an increase in the amount of power to be provided by the processing apparatus when the processing apparatus has processed addresses and data for a percentage of time greater than the first particular percentage of time in each repetitive time period and wherein the control device provides for a decrease in the amount of power to be provided by the processing apparatus when the processing apparatus has processed addresses and data for a percentage of time less than the second particular percentage of time in each repetitive time period.

6. In combination for providing a controlled amount of power to an apparatus for processing addresses and data intermittently, an interface/control for receiving an indication at each instant from the processing apparatus as to whether or not the processing apparatus has been activated to process addresses and data, a counting device operative in each of a plurality of successive repetitive time periods for indicating in the repetitive time periods the relative amount of time that the processing apparatus is addressing and processing data, registers for indicating fixed values of relative amounts of time in each repetitive time periods, a determining device operative during each of the repetitive time periods for determining the amount of time during each of such successive repetitive time periods that the processing apparatus is processing addresses and data relative to the fixed values of the relative amounts of time, a source of variable power for operating the processing apparatus, and a control device for varying the power from the source in accordance with the determinations provided by the determining device in each repetitive time period.

7. In a combination as set forth in claim 6 wherein the determining device includes comparators which compare the indications from the counting device with the indications from the registers to provide signals dependent upon such comparisons and wherein a state machine establishes the power in the source at a level dependent upon the signals from the comparators.

8. In a combination as set forth in claim 6 wherein the control device provides for an increase in the power from the source for determinations of relative amounts of time from the determining device greater than a fixed value from a first particular one of the registers and provides for a decrease in the power from the source for determinations of relative amounts of time from the determining device less than a fixed value from a second particular one of the registers where the fixed value from the second particular one of the registers is less than the fixed value from the first particular one of the registers.

9. In a combination as set forth in claim 6 wherein a second counting device provides a delay between the end of each repetitive time period and the beginning of the next repetitive time period and wherein the control device adjusts, during each delay provided by the second counting device, the amount of power provided by the processing apparatus in accordance with the determination provided by the determining device in the repetitive time period just ended.

10. In a combination as set forth in claim 7 wherein the control device provides for an increase in the power from the source for determinations of relative amounts of time from the determining device greater than a fixed value from a first one of the registers and provides for a decrease in the power from the source for determinations of relative amounts of time from the determining device less than a fixed value from a second one of the registers where the fixed value from the second register is less than the fixed value from the first register, and wherein a second counting device provides a delay between the end of each repetitive time period and the beginning of the next repetitive time period and wherein the control device adjusts, during each delay provided by the second counting device, the amount of power provided by the processing apparatus in accordance with the determination provided by the determining device in the repetitive time period just ended.

11. In combination for providing a controlled amount of power to an apparatus for intermittently processing addresses and data, an interface/control for receiving an indication at each instant from the processing apparatus as to whether or not the processing apparatus is processing addresses and data, a state machine, lines extending between the interface/control and the state machine for instructing the state machine as to the power level to be initially provided by the processing apparatus when the processing apparatus starts to process addresses and data and for indicating to the interface/control the state at which the state machine is operating at each instant and for adjusting the power level to be provided by the processing apparatus, a first device for providing repetitive periods of time, and a second device for determining a duty cycle of the power applied to the processing apparatus in each of the repetitive periods of time provided by the first device and for introducing such determinations to the state machine to obtain a production of control signals from the state machine in accordance with such determinations and a third device responsive to the control signals from the state machine for adjusting the power level provided by the processing apparatus in accordance with the duty cycle of the power applied to the processing apparatus in each of the repetitive periods of time provided by the first device.

12. In a combination as set forth in claim 11 wherein a fourth device is provided for producing a particular delay between the end of each repetitive period of time and the beginning of the next repetitive period of time to provide time for the state machine to adjust the power level provided by the processing apparatus.

13. A method of providing a controlled amount of power to an apparatus for intermittently processing addresses and data, including the steps of:

providing a repetitive count of a pre-set time period, counting during each repetitive time period the time percentage during which the apparatus is processing data, providing for a variable amount of power to be provided by the processing apparatus at each instant to provide for the operation of the apparatus in processing data, increasing the amount of power to be provided by the processing apparatus in each repetitive time period when the time percentage during the repetitive time period is above a first particular value, and decreasing the amount of power to be provided by the processing apparatus in each repetitive time period when the time percentage during the repetitive time period is below a second particular value where the second particular value is less than the first particular value.

14. A method as set forth in claim 13 wherein the variable amount of power to be provided by the processing apparatus is in the form of clock signals at a variable frequency and wherein the frequency of the clock signals is increased to increase the power provided by the processing apparatus and wherein the frequency of the clock signals is decreased to decrease the power provided by the processing apparatus.

15. A method as set forth in claim 13 wherein a particular delay is provided between each repetitive time period and the next repetitive time period to provide time for the power provided by the processing apparatus to be increased or decreased at the end of each repetitive time period.

16. A method as set forth in claim 13 wherein the count of the time percentage is provided only during the repetitive time periods in which the processing apparatus is processing addresses or data.

17. A method as set forth in claim 13 wherein the amount of power provided by the processing apparatus upon an initiation of a processing of addresses and data by the processing apparatus is initially set to a particular value.

18. A method as set forth in claim 14 wherein a particular delay is provided between each repetitive time period and the next repetitive time period to provide time for the power provided by the processing apparatus to be increased or decreased at the end of each repetitive time period and wherein the count of the time percentage is provided only during the repetitive time periods in which the processing apparatus is processing addresses or data and wherein the amount of power provided by the processing apparatus upon an initiation of a processing of addresses or data by the processing apparatus is initially set to a particular value.

19. A method of providing a controlled amount of power to an apparatus for intermittently processing addresses and data, including the steps of:

providing a first count on a repetitive basis of a particular time period, providing a second count in each particular time period of the portion of the time during the particular time period that the apparatus is processing addresses and data, providing power to the apparatus to obtain the processing of addresses and data by the apparatus, increasing at the end of each particular time period the amount of power provided by the processing apparatus when the portion of the time in the second count is above a first particular value, and decreasing at the end of each particular time period the amount of power provided by the processing apparatus when the portion of the time in the second count is below a second particular value where the second particular value is less than the first particular value and where the first particular value is less than the first count.

20. A method as set forth in claim 19 wherein the power provided by the intermittently processing apparatus constitutes clock signals having a variable frequency and wherein the frequency of the clock signals is increased to increase the power provided by the processing apparatus and wherein the frequency of the clock signals is decreased to decrease the power provided by the processing apparatus.

21. In a combination as set forth in claim 11 wherein the second device includes a counter, a first register set to a first particular duty cycle, a second register set to a second particular duty cycle different from the first particular duty cycle, a first comparator for comparing the first particular duty cycle and the duty cycle in the counter in each repetitive period of time and for indicating the results of the comparison and a second comparator for comparing the second particular duty cycle and the duty cycle in the counter in each repetitive period of time.

22. In a combination as set forth in claim 21 wherein a fourth device is responsive to each determination by the second device for providing a control period of time for adjusting the power level provided by the processing apparatus and for preventing the first device from providing the repetitive periods of time during the control period of time.

23. A method as set forth in claim 19 wherein the increase in the amount of the power provided by the processing apparatus at the end of each particular time period is provided by providing a memory of the first particular value and by comparing the second count at the end of each particular time period with the first particular value and wherein the decrease in the amount of the power provided by the processing apparatus at the end of each particular time period is provided by providing a memory of the second particular value and by comparing the second count at the end of each particular time period with the first particular value.

24. A method as set forth in claim 23 wherein the first count is provided by counting oscillator signals having a particular frequency on a continuous basis during the particular time period and wherein the second count in each particular time period is provided by counting the oscillator signals during the portion of the time in the particular time period that the processing apparatus is processing apparatus and data.

25. A method as set forth in claim 24 wherein the power provided by the apparatus constitutes clock signals having a variable frequency and wherein the frequency of the clock signals is increased to increase the power provided by the processing apparatus and wherein the frequency of the clock signals is decreased to decrease the power provided by the processing apparatus.

26. In combination for providing a controlled amount of power to an apparatus which processes addresses and data intermittently, a first device for providing repetitive time periods, a counting device for determining in each repetitive time period the relative amount of time that the processing apparatus intermittently processes addresses and data and for providing indications representing such determinations, stages for providing particular thresholds, a control device for providing a variable control of the amount of power to be provided by the processing apparatus in the repetitive time periods, a comparator device for comparing the indications from the counting device with the particular thresholds to determine whether the variable control from the control device should be varied to provide for an adjustment in the amount of power to be provided by the processing apparatus, and a main state machine responsive to the operation of the comparator device for operating the control device to vary the amount of power provided by the control device in accordance with determinations by the comparator device.

27. In a combination as set forth in claim 26 wherein the first device counts to a particular value oscillatory signals at a particular frequency to provide the repetitive time period and wherein the counting device counts the oscillatory signals in each repetitive time period during the portion of the time in the repetitive time period that the processing apparatus is processing addresses and data.

28. In a combination as set forth in claim 27 wherein the counting device counts the oscillatory signals during the time that the first device provides the repetitive time periods and wherein the counting device is a first counting device and wherein a second counting device is responsive at the end of each repetitive time for initiating a count of the oscillatory signals to a particular value and wherein the first device provides each repetitive time period at the end of the count by the second counting device to the particular value.

29. In a combination as set forth in claim 28 wherein the control device comprises a generator operatively coupled to the main state machine to provide at each instant a clock signal having a frequency variable in accordance with the operation of the main state machine.

30. In combination, an apparatus for intermittently processing addresses and data, a first device for providing a repetitive time period, a second device for determining the time for the intermittent processing by the processing apparatus in each repetitive time period, a generator for generating a variable amount of power, and a control device operatively coupled to the second device and the generator for varying the amount of power provided by the generator at the end of each repetitive time period in accordance with the determination provided by the second device in the repetitive time period.

31. In a combination as set forth in claim 30 wherein the second device includes a counter for counting the time in each repetitive time period that the processing apparatus intermittently processes the addresses and the data and includes comparators for determining whether this count is greater than a first particular value and is less than a second particular value and wherein the control device is responsive to the determinations from the comparators for varying the amount of power provided by the generator at the end of each repetitive time period.

32. In a combination as set forth in claim 30 wherein the control device includes a main state machine and wherein an interface/control is responsive to the intermittent processing by the processing apparatus in each repetitive time period for activating the second device to provide the determination in that repetitive time period.

33. In a combination as set forth in claim 30, including, a third device for providing an additional period at the end of each repetitive time period, the third device being operatively coupled to the first device to prevent the first device from determining each new repetitive time period until after the third device has provided the additional time period at the end of the previous repetitive time period.

34. In a combination as set forth in claim 30, a third device for providing an additional period at the end of each repetitive time period, the third device being operatively coupled to the first device to prevent the first device from determining each new repetitive time period until after the third device has provided the additional time period at the end of the previous repetitive time period, the control device including a main state machine operatively coupled to the interface/control to provide for the passage of control signals in opposite directions between the interface/control and the main state machine.

* * * * *

UNITED STATES PATENT AND TRADEMARK OFFICE
CERTIFICATE OF CORRECTION

PATENT NO. : 6,047,038
DATED      : April 4, 2000
INVENTOR(S) : William A. Broadhurst, Gregory A. Stoike It is certified that error appears in the above-identified patent and that said Letters Patent is hereby corrected as shown below:

Title page, under "ABSTRACT", line 17 of text, delete "provided by", add --determined from--.

Column 3, lines 25, change "ctl."", to read --ctl".--.

Column 3, line 36, after "operating", add --,--.

Column 3, lines 44-46, delete "when the RSTA signal from the main state machine 58 again become high" and move these words to column 3, line 48, after "Figure", but before the ".".

Column 5, line 17, change "RSTB", to read --RSTA--.

Column 5, lines 31-33, after "46", delete "to obtain a determination as to whether the power needed to operate the processing apparatus 11 has to be changed", and move this text to line 37, after "46", but before the ".".

Signed and Sealed this

Twenty-seventh Day of February, 2001

Attest:

NICHOLAS P. GODICI

Attesting Officer

Acting Director of the United States Patent and Trademark Office